United States Patent [19]

Wrobbel et al.

[11] Patent Number: 4,799,853
[45] Date of Patent: Jan. 24, 1989

[54] SELF-CENTERING END EFFECTOR

[75] Inventors: Edward J. Wrobbel, Fairport; Louis S. Canzoneri; Ronald P. Cocchiara, both of Rochester; Nikhil C. Paul, Webster, all of N.Y.

[73] Assignee: Xerox Corporation, Stamford, Conn.

[21] Appl. No.: 915,596

[22] Filed: Oct. 6, 1986

[51] Int. Cl.$^4$ .............................................. B66C 1/54
[52] U.S. Cl. ...................................... 414/730; 294/90; 294/93; 901/39; 901/45
[58] Field of Search ...................... 901/45, 30, 31, 39; 294/86.24, 88, 89, 93; 414/730

[56] References Cited

U.S. PATENT DOCUMENTS

| | | | |
|---|---|---|---|
| 1,776,776 | 9/1930 | Blackmarr | 294/93 X |
| 3,418,020 | 12/1968 | Brubaker | 294/93 |
| 3,429,607 | 2/1969 | White | 294/89 |
| 3,610,449 | 10/1971 | Hashimoto et al. | 414/734 |
| 3,977,687 | 8/1976 | Manganelli | 294/93 X |
| 4,059,188 | 11/1977 | McDonald . | |
| 4,086,999 | 5/1978 | McDonald | 294/93 X |
| 4,116,325 | 9/1978 | McDonald . | |
| 4,266,905 | 5/1981 | Birk et al. | 414/627 |
| 4,291,910 | 9/1981 | Maupate . | |
| 4,314,524 | 2/1982 | Deguchi | 901/30 X |
| 4,340,249 | 7/1982 | Bucklew | 294/88 X |
| 4,449,592 | 5/1984 | Mayer | 414/22 X |
| 4,576,407 | 3/1988 | Lambert | 901/39 X |
| 4,580,826 | 4/1986 | Carver et al. | 294/86.24 X |

FOREIGN PATENT DOCUMENTS 2143798 2/1985 United Kingdom .

Primary Examiner—Robert J. Spar
Assistant Examiner—William M. Hienz
Attorney, Agent, or Firm—H. Fleischer; J. E. Beck; R. Zibelli

[57] ABSTRACT

An apparatus which acquires individual articles having a substantially cylindrical aperture therein from a supply of roughly aligned articles in a storage bin. The apparatus grips the article on the interior wall of the cylindrical aperture therein. The gripper is moved to retract the article from the storage bin. The article is then moved to a receiving member which aligns the longitudinal axis of the cylindrical aperture of the article substantially parallel or coincidental with the longitudinal axis of the receiving member.

8 Claims, 2 Drawing Sheets

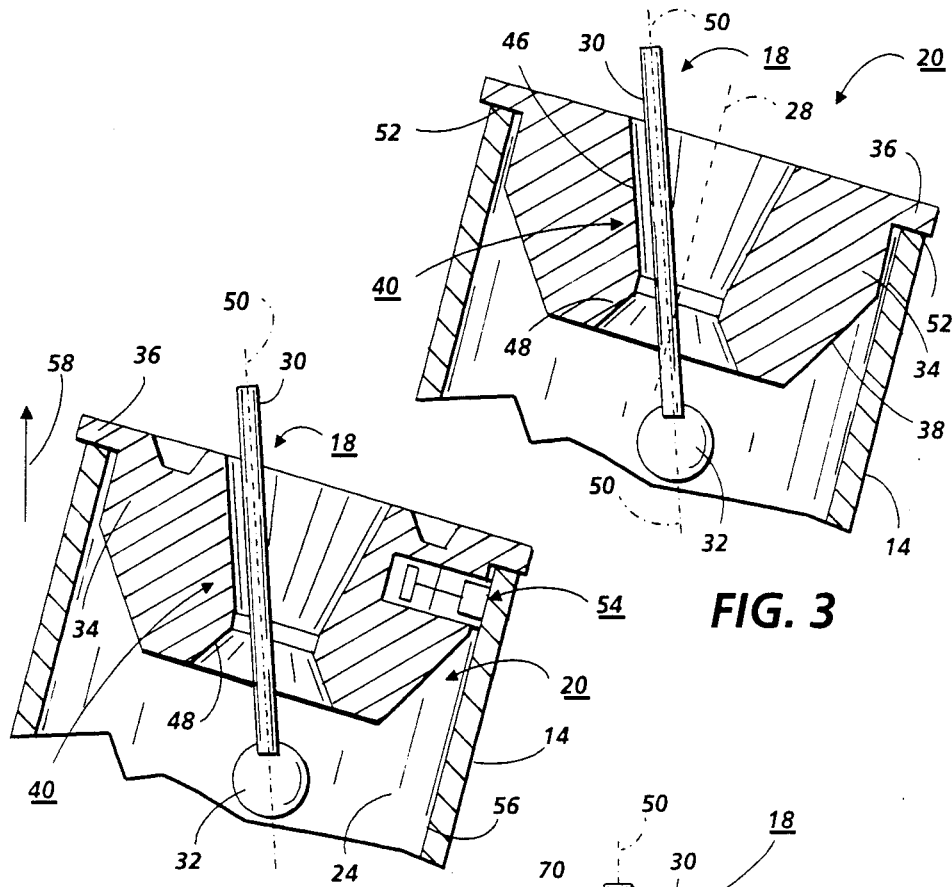
FIG. 3
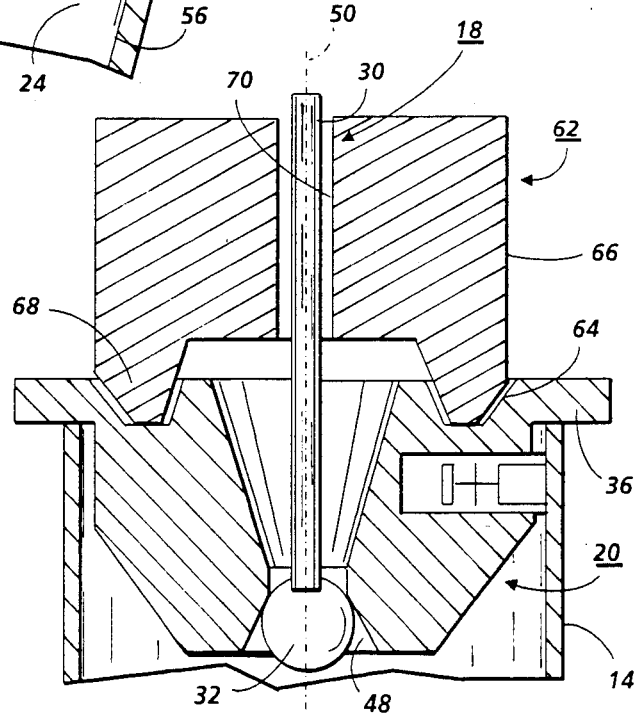
FIG. 4
FIG. 5

SELF-CENTERING END EFFECTOR

This invention relates generally to an end effector for use with a robotic assembly, and more particularly concerns an apparatus for acquiring individual articles having a substantially cylindrical aperture therein from a supply of articles thereof roughly aligned in a storage bin.

There are a wide variety of assembly line operations involving the handling and processing of individual articles. In such operations, robotic assemblies have been employed to automate the handling and processing of these articles. End effectors are employed by the robotic assembly to acquire an individual article from a supply of articles in a storage bin. The articles are usually only roughly aligned. Thus, each acquired article must be properly aligned with respect to the centerline of the robot. A typical end effector will pick up and place these articles in approximately the same attitude as the individual articles are oriented in the storage bin. Generally, this is not satisfactory in that articles having cylindrical openings therein should have the longitudinal axis of the cylindrical opening aligned with the centerline of the robot assembly. The end effector must be able to handle parts of various wall thicknesses without distorting the shape of the article. In addition, the end effector must be capable of handling a small range of diameters and lengths, and be able to firmly grasp a long part within the uppermost portion thereof. The grasp of the end effector must be such that it maintains the part's position unchanged with respect to the robot while the part undergoes the forces and movement induced by the acceleration and velocity of the robot's movement. Known end effectors have generally failed to achieve the foregoing because of their inability to acquire roughly aligned articles in a reliable and consistent manner. Heretofore, it has been suggested that the end effector might be supported by a flexible connector so that the gripper mechanism thereof can conform to a roughly aligned article. However, in this arrangement, it has been found that after the article has been elevated from the supply bin, subsequent accurate orientation of the article is either very difficult or impossible due to the flexibility of the connector. Another approach has been to mount the end effector on a rigid support which can be adjusted in only a single direction. A problem associated with this type of arrangement is that the surface angles of the roughly aligned article vary widely relative to the direction of movement of the end effector. Since the end effector is connected to a relatively rigid support, its freedom of movement is restricted and frequently insufficient to allow the article to be adequately gripped for removal from the storage bin.

Various techniques have been devised for acquiring work pieces in robotic assemblies. The following disclosures appear to be relevant:

U.S. Pat. No. 3,610,449; Patentee: Hashimoto et al.; Issued: Oct. 5, 1971.

U.S. Pat. No. 4,266,905; Patentee: Birk et al.; Issued: May 12, 1981.

The relevant portions of the foregoing disclosures may be briefly summarized as follows:

Hashimoto et al. discloses a material handling device which employs a free floating end effector for removing cakes from a centrifugal spinning machine. The end effector consists of a free floating head which can be retracted by means of a cable into contact with a stabilizing sleeve. The free floating head includes an expandable inner diameter gripper. A sponge cake is gripped by the free floating head and then both the head and the cake are retracted into contact with the stabilizing sleeve. The stabilizing sleeve is attached to a movable arm which transports the cake to a storage area.

Birk et al. describes a material handling device which utilizes a free floating gripper head to lift work pieces from a storage bin. The gripper is attached to an overhead movable assembly by means of a flexible support. The gripper head is lowered from the overhead movable assembly and allowed to come into contact with the work piece. The gripper head consists of a suction device, which once in planar contact with the work piece, will grip the work piece. Once the work piece is firmly gripped, the gripper head is retracted by means of a flexible support to lock against an abutment surface fixed relative to the head assembly.

In accordance with one aspect of the present invention, there is provided an apparatus for acquiring individual articles having a substantially cylindrical aperture therein from a supply of roughly aligned articles in a storage bin. The apparatus includes a fixedly mounted head assembly. Means, arranged to be interfit into the cylindrical aperture of an article, grip the article. Means move the gripping means into the cylindrical aperture of the article and retract the gripping means with the article secured releasably thereto from the storage bin. Means, associated with the head assembly, receive the gripping means and substantially align the longitudinal axis of the cylindrical aperture of the article substantially parallel or coincidental with the longitudinal axis of the receiving means.

Other features of the present invention will become apparent as the following description proceeds and upon reference to the drawings, in which:

FIG. 3 illustrates the FIG. 2 end effector when the article has been acquired;

FIG. 4 depicts the FIG. 3 end effector when it is gripping the article; and

FIG. 5 shows the end effector moving with the article to its attracted position so as to align the article with the robotic assembly.

Figures 1, 2:
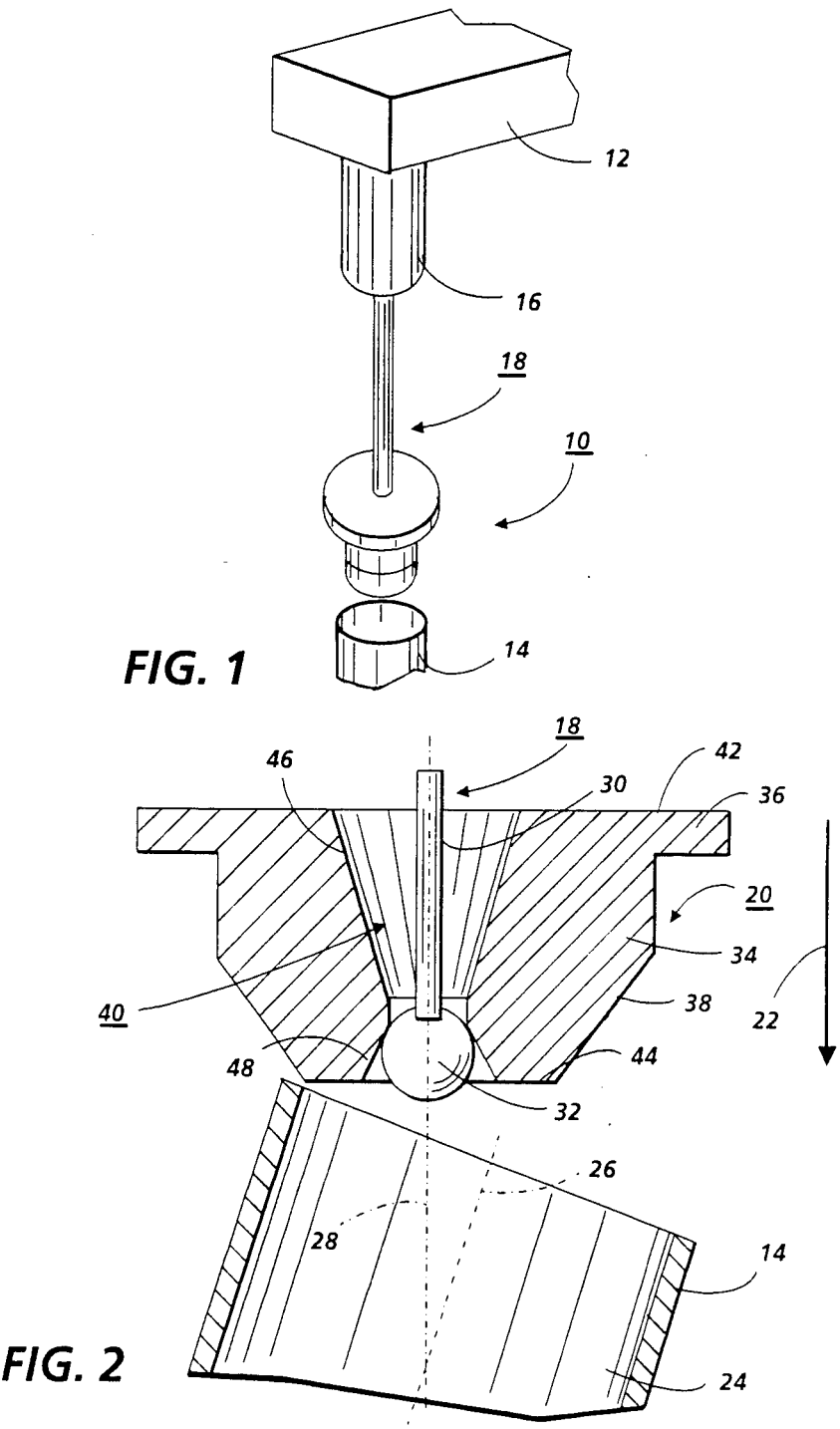
FIG. 1 is a fragmentary perspective view of a robotic assembly employing the apparatus of the present invention therein.
FIG. 2 is a sectional elevational view showing the end effector of the FIG. 1 robotic assembly acquiring a roughly aligned article.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Referring now to FIG. 1, the end effector of the present invention, indicated generally by the reference numeral 10 is mounted on a movable robotic arm 12. Robotic arm 12 is the arm of a remotely controlled robot. End effector 10 is shown in an operative position overlying a storage bin containing a supply of roughly aligned articles 14. As shown, end effector 10 is in the process of acquiring one such oriented article 14. Basically, end effector 10 includes a head assembly 16 mounted fixedly on robotic arm 12. Gripping apparatus 20 is connected movably to head assembly 16 by shaft 18. Shaft 18 moves gripping assembly 20 in vertical direction to place it in an operative position with respect to article 14. All of the articles being acquired by gripping assembly 20 are basically tubular. Thus, each article has a cylindrical internal aperture therein. The detailed manner of operation of end effector 10 will be described hereinafter with respect to FIGS. 2 through 5, inclusive.

Turning now to FIG. 2, there is shown shaft 18 and gripping assembly 20 moving downwardly in the direction of arrow 22. Article 14 is tubular having a cylindrical aperture 24 therein. The longitudinal axis 26 of article 14, which substantially corresponds to the longitudinal axis of aperture 24, is skewed from the longitudinal axis 28 of gripping assembly 20. When gripping assembly 20 is spaced from article 14, the longitudinal axis of shaft 18 is substantially parallel or coincidental with the longitudinal axis 28 of gripping assembly 20. Shaft 18 includes a rod 30 having an hemisphere, conical section or ball 32 secured fixedly at one end thereof. The other end of rod 30 is mounted movably in head assembly 16. By way of example, the other end of the rod 30 may be coupled to a pneumatic assembly, or a ratchet meshing with a gear driven by a motor, so as to move shaft assembly 18 in the vertical direction. Gripper assembly 20 includes a cylindrical portion 34 having a flanged portion 36 integral with it on one end thereof. A tapered portion 38 is integral with and extends inwardly from the other end of cylindrical portion 34. An aperture 40 extends from surface 42 on flanged portion 36 to surface 44 on tapered portion 38. Thus, aperture 40 extends through gripper assembly 20 from one end surface 42 to the other end surface 44 thereof. The longitudinal axis of aperture 40 is substantially parallel or coincidental with the longitudinal axis of cylindrical portion 34 which, in turn, substantially defines the longitudinal axis of gripper assembly 20. Aperture 40 includes two intersecting truncated, conical openings 46 and 48 which intersect one another. The base of truncated, conical opening 46 is on surface 42. The base of truncated, conical aperture 48 is on surface 44. The diameter of the base of truncated, conical opening 46 is greater than the diameter of ball 32. Similarly, the diameter of the base of truncated, conical opening 48 is greater than the diameter of the ball 32. However, the opening opposed from the respective bases has a diameter less than that of ball 32. A portion of shaft assembly 18 passes through aperture 40. Rod 30 is spaced from the interior walls of aperture 40. As shaft assembly 18 moves in the downwardly direction with gripper assembly 20, gripper assembly 20 rests on ball 32. Ball 32 is located in truncated, conical opening 48 and engages the side walls thereof as shaft assembly 18 moves in the downwardly direction. Thus, gripper assembly 20, under the influence of gravity, rests on ball 32 and moves in the downwardly direction with shaft assembly 18. As shaft assembly 18 moves in the direction of arrow 22, tapered portion 38 enters aperture 24 of article 14. Cylindrical portion 34 of gripper assembly 20 is of a slightly smaller diameter than the diameter of aperture 24. As cylindrical portion 34 enters into aperture 24, gripper assembly 20 skews with respect to shaft assembly 18. The longitudinal axis 28 of cylindrical portion 34 becomes substantially parallel or coincidental with the longitudinal axis of aperture 24. At this time, longitudinal axis 50 (FIG. 3) of shaft assembly 18 is misaligned from longitudinal axis 28. The foregoing is shown clearly in FIG. 3.

Turning now to FIG. 3, the shaft assembly continues to move in the downwardly direction until flange portion 36 rests on end 52 of article 14. Shaft assembly 18 is free to continue to move in the downwardly direction spacing ball 32 from gripper assembly 20. When flange portion 36 is seated on end 52 of article 14, the longitudinal axis of cylindrical portion 34 is substantially parallel or coincidental with the longitudinal axis of aperture 24 of article 14. At this time, grippers 54 (FIG. 4) will be actuated to secure the gripper assembly 20 to article 14. This is shown in greater detail in FIG. 4.

As shown in FIG. 4, grippers, indicated generally by the reference numeral 54, move outwardly from cylindrical portion 34 to engage the interior walls 56 of article 14 securing gripper assembly 20 thereto. Grippers 54 include a plunger adapted to move in a direction substantially normal to the surface of cylindrical portion 34 so as to engage interior walls 56. By way of example, grippers 54 may include a plunger which moves outwardly from cylindrical portion 34 into engagement with interior walls 56. The plunger of gripper 54 may be actuated by a pneumatic system, or alternatively, by an electrical solenoid. In any event, the plunger applies pressure to side walls 56 securing gripper assembly 20 in article 14. After gripper 54 has been actuated, shaft assembly 18 moves in an upwardly direction, in the direction of arrow 58. As shaft assembly 18 moves in the direction of arrow 58, ball 32 on the end of rod 30 engages the side walls of truncated, conical aperture 48. Inasmuch as ball 32 in aperture 48 forms a universal joint, gripper assembly 20 and article 48 move thereabout, under the influence of gravity to align longitudinal axis 28 either parallel or coincidental with longitudinal axis 28 of cylindrical portion 34 and longitudinal axis 50 of shaft assembly 18. Inasmuch as longitudinal axis 28 is substantially parallel or coincidental with the longitudinal axis of aperture 24 in article 14, article 14 has been aligned with gripper assembly 20. As shaft assembly 18 continues to move in an upwardly direction, both gripper assembly 20 and article 14 move therewith. This movement ceases when gripper assembly 20 mates with the receiving member, indicated generally by the reference numeral 62, (FIG. 5) mounted fixedly in head assembly 16. The details of the mating operation will be shown hereinafter with respect to FIG. 5.

Turning to FIG. 5, gripper assembly 20 is shown mating with receiving member 62. Gripper assembly 20 includes a circular slot 64 in flanged portion 36. Slot 64 has a truncated conical cross section. Receiving member 62 includes a cylindrical portion 66 having a tubular protrusion 68 extending from the lowermost region thereof. Tubular protrusion 68 is of a truncated, conical cross section. A cylindrical opening 70 extends from one end of receiving member 62 to the other end thereof. The longitudinal axis of opening 70 is substantially parallel or coincidental with the longitudinal axis of cylindrical portion 66. Similarly, the longitudinal axis of tubular protrusion 68 is substantially parallel or coincidental with the longitudinal axis of portion 66. Rod 30 extends through opening 70 and is spaced from the interior walls thereof. As shaft assembly 18 moves in the upwardly direction, tubular protrusion 68 mates with slot 64 in flange 36 of gripper assembly 20. Inasmuch as ball 32 is seated against the walls of truncated, conical opening 48 to form a universal joint, the longitudinal axis of aperture 24 in article 14 is aligned, i.e. parallel or coincidental with the longitudinal axis of receiving member 62. Receiving member 62 is mounted fixedly in head assembly 16. Thus, the longitudinal axis of article 14 is now defined with respect to head assembly 16. This enables the robotic assembly to operate on article 14 with the longitudinal axis thereof being precisely defined for successive operations.

In recapitulation, it is apparent that the apparatus of the present invention is capable of acquiring a roughly aligned article having a cylindrical aperture. The apparatus grips the article and aligns the article automatically with respect to the robotic head assembly.

It is, therefore, apparent that there has been provided in accordance with the present invention, an apparatus that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. An apparatus for acquiring an individual article having a substantially cylindrical aperture therein from a supply of roughly aligned articles in a storage bin, including:
   a fixedly mounted head assembly;
   means for gripping the article, said gripping means comprising a cylindrical portion adapted to be interfit into the cylindrical aperture of the article, and a flange portion fixedly connected to and extending outwardly from one end of said cylindrical portion and adapted to abut against one end of the article when said cylindrical portion has been interfit into the cylindrical aperture of the article;
   means for moving said gripping means into the cylindrical aperture of the article and retracting said gripping means with the article secured releasably thereto from the storage bin; and
   means, associated with said head assembly, for receiving said gripping means and substantially aligning the longitudinal axis of the cylindrical aperture of the article substantially parallel with the longitudinal axis of said receiving means.

2. An apparatus according to claim 1, wherein said gripping means includes at least one gripper member arranged to move outwardly from said cylindrical portion into engagement with at least a portion of the interior surface of the cylindrical aperture of the article to secure the article to said gripping means.

3. An apparatus for acquiring individual articles having a substantially cylindrical aperture therein from a supply of roughly aligned articles in a storage bin, including:
   a fixedly mounted head assembly;
   means for gripping the article, said gripping means comprising a cylindrical portion adapted to be interfit into the cylindrical aperture of the article, a flange portion extending outwardly from one end of said cylindrical portion and adapted to abut against one end of the article when said cylindrical portion has been interfit into the cylindrical aperture of the article, at least one gripper member arranged to move outwardly from said cylindrical portion into engagement with at least a portion of the interior surface of the cylindrical aperture of the article to secure the article to said gripping means, and an aperture extending from one end of said gripping means to the other end thereof opposed from said flange portion with the longitudinal axis of the aperture being substantially parallel with the longitudinal axis of said cylindrical portion;
   means for moving said gripping means into the cylindrical aperture of the article and retracting said gripping means with the article secured releasably thereto from the storage bin, said moving means being positioned to extend through the aperture in said gripping means; and
   means, associated with said head assembly, for receiving said gripping means and substantially aligning the longitudinal axis of the cylindrical aperture of the article substantially parallel with the longitudinal axis of said receiving means.

4. An apparatus according to claim 3, wherein the aperture in said gripping means includes a truncated, conical opening extending inwardly from said other end of said gripping means with the base opening of said conical opening being located on said other end of said gripping means and the longitudinal axis of said conical opening being substantially parallel with the longitudinal axis of said cylindrical portion.

5. An apparatus according to claim 4, wherein said moving means includes a shaft having a ball mounted on one end thereof, said shaft having at least a portion thereof located in and spaced from the interior surface of the aperture in said gripping means with the ball having a diameter greater than the diameter of the opening of the truncated, conical opening opposed from the base opening thereof, said ball having a diameter less than the diameter of the base opening so that the exterior surface of said ball engages the interior surface of the tapered side walls of said gripping means in the truncated, conical opening when said moving means retracts said gripping means.

6. An apparatus according to claim 5, wherein said receiving means includes a protruding portion arranged to mate with a slot in said one end of said gripping means with the longitudinal axis of the slot being substantially parallel with the longitudinal axis of said cylindrical portion of said gripping means.

7. An apparatus according to claim 6, wherein:
   said protruding portion includes a conical guide; and
   said slot in said one end of said gripping means is conical to mate with said conical guide.

8. An apparatus according to claim 7, wherein said receiving means includes an aperture with the longitudinal axis thereof being substantially parallel with the longitudinal axis of said conical guide, said shaft having a portion thereof passing through the aperture and being spaced from the interior surface of said receiving means.

* * * * *